(12) United States Patent  (10) Patent No.: US 9,146,623 B1
Kuscher et al.  (45) Date of Patent: Sep. 29, 2015

(54) SYSTEMS AND METHODS FOR REGISTERING KEY INPUTS

(71) Applicant: Google Inc., Mountain View, CA (US)

(72) Inventors: Alexander Friedrich Kuscher, San Francisco, CA (US); John Nicholas Jitkoff, Palo Alto, CA (US); Bryan Russell Yeung, Waterloo, CA (US)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 13/973,848

(22) Filed: Aug. 22, 2013

(51) Int. Cl.
*G06F 3/041* (2006.01)
*G06F 3/023* (2006.01)
*G06F 3/0489* (2013.01)

(52) U.S. Cl.
CPC ............ *G06F 3/0238* (2013.01); *G06F 3/0489* (2013.01)

(58) Field of Classification Search
CPC ....................................... G06F 3/041–3/04897
USPC ......... 345/173–178; 178/18.01–18.09, 18.11; 715/863
See application file for complete search history.

(56) References Cited

U.S. PATENT DOCUMENTS

| 7,649,478 | B1 | 1/2010 | Yoon | |
|---|---|---|---|---|
| 2007/0200827 | A1 | 8/2007 | Samal | |
| 2008/0180403 | A1* | 7/2008 | Park et al. | 345/173 |
| 2009/0089666 | A1* | 4/2009 | White et al. | 715/257 |
| 2010/0020033 | A1 | 1/2010 | Nwosu | |
| 2010/0026650 | A1 | 2/2010 | Srivastava et al. | |
| 2011/0231796 | A1 | 9/2011 | Vigil | |
| 2011/0242137 | A1* | 10/2011 | Lee et al. | 345/660 |
| 2011/0260977 | A1 | 10/2011 | Frank et al. | |
| 2012/0075192 | A1* | 3/2012 | Marsden et al. | 345/168 |
| 2012/0182234 | A1 | 7/2012 | Huang et al. | |

FOREIGN PATENT DOCUMENTS

| EP | 2149837 A1 | 2/2010 |
|---|---|---|
| WO | WO-2008/096934 A1 | 8/2008 |

OTHER PUBLICATIONS

Yee, "The Best Android Tips and Tricks," <www.techsupportalert.com/content/best-android-tips-and-tricks.htm>, Aug. 5, 2013.
Hoffman, "Type Faster: 6 Tips and Tricks for Mastering Android's Keyboard," How to Geek, <www.howtogeek.com/165026/type-faster-6-tips-and-tricks-for-mastering-androids-keyboard>, Jun. 10, 2013.

* cited by examiner

*Primary Examiner* — Stephen Sherman
(74) *Attorney, Agent, or Firm* — McDermott Will & Emery LLP (57) ABSTRACT

Systems and methods for registering key inputs are provided. A system includes an input module configured to detect a first key input by a user at a point on a layout of primary keys. The system includes a correction module configured to determine whether the first key input is associated with a single one of the primary keys or a plurality of the primary keys. The input module is configured to detect a second key input if the first key input is determined to be associated with the plurality of the primary keys. The second key input includes a swipe gesture by the user from the point at which the first key input is detected on the layout towards a particular one of the plurality of the primary keys. The system includes a selection module configured to register the first or second key input as an actual key input.

19 Claims, 10 Drawing Sheets

SYSTEMS AND METHODS FOR REGISTERING KEY INPUTS

FIELD

The subject technology generally relates to key inputs and, in particular, relates to systems and methods for registering key inputs.

BACKGROUND

As electronic devices equipped with touchscreens have become increasingly popular, virtual keyboards have also become popular. However, the lack or reduction of tactile feedback in the use of virtual keyboards may contribute to higher error rates compared to the use of physical keyboards. Furthermore, because virtual keyboards are typically much smaller in size than physical keyboards, users of virtual keyboards may have a higher tendency to hit the incorrect key or even areas in between keys.

SUMMARY

According to various aspects of the subject technology, a system for registering key inputs is provided. The system comprises one or more processors and memory storing one or more programs to be executed by the one or more processors. The one or more programs comprise an input module configured to detect a first key input by a user at a point on a layout of primary keys. The one or more programs also comprise a correction module configured to determine whether the first key input is associated with a single one of the primary keys or a plurality of the primary keys. The input module is configured to detect a second key input if the first key input is determined to be associated with the plurality of the primary keys. The second key input comprises a swipe gesture by the user from the point at which the first key input is detected on the layout towards a particular one of the plurality of the primary keys. The one or more programs also comprise a selection module configured to register the first key input or the second key input as an actual key input.

According to various aspects of the subject technology, a method for registering key inputs is provided. The method comprises detecting a first key input by a user at a point on a layout of primary keys. The method also comprises determining whether the first key input is associated with a single one of the primary keys or a plurality of the primary keys. The method also comprises detecting a second key input if the first key input is determined to be associated with the plurality of the primary keys. The second key input comprises a swipe gesture by the user from the point at which the first key input is detected on the layout towards a particular one of the plurality of the primary keys. The method also comprises registering, by a processor, the first key input or the second key input as an actual key input.

According to various aspects of the subject technology, a computer program product comprising instructions stored in a tangible computer-readable storage medium is provided. The instructions comprise instructions for detecting a first key input by a user at a point on a layout of primary keys. The first key input comprises a tap by the user on the point on the layout of the primary keys. The layout of primary keys comprises a virtual keyboard. The instructions also comprise instructions for determining whether the first key input is associated with a single one of the primary keys or a plurality of the primary keys. The instructions also comprise instructions for detecting a second key input if the first key input is determined to be associated with the plurality of the primary keys. The second key input comprises a swipe gesture by the user from the point at which the first key input is detected on the layout to a particular one of the plurality of the primary keys. The tap is continuously followed by the swipe gesture. The instructions also comprise instructions for registering, by a processor, the first key input or the second key input as an actual key input.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

According to various aspects of the subject technology, systems and methods are provided for addressing mistyping problems by users of virtual or other touch-based keyboards. An error correction user interface that is faster and more precise than other existing methods is provided. According to certain aspects, when a user desires to hit a particular key on a virtual keyboard but misses (e.g., the user hits the area in between keys or hits the wrong key), the user is allowed to flick towards the direction of the particular key that the user intended to hit, thereby allowing the user to quickly correct the mistyping. In some aspects, when a user dwells on a particular area of the virtual keyboard, surrounding keys may be displayed (e.g., in a radial menu) in order to allow the user to quickly select the key that the user intended to hit.

Figure 1:
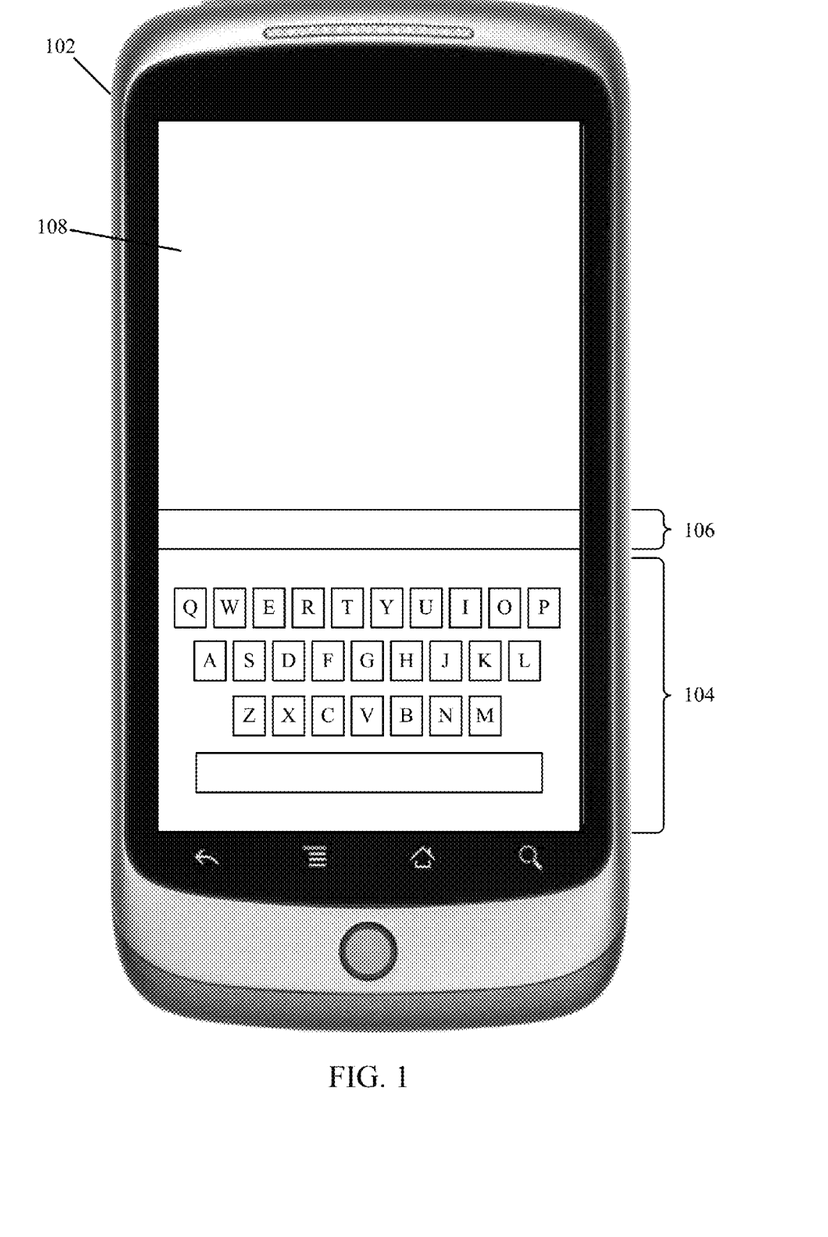
FIG. 1 illustrates an example of a mobile device equipped with a touchscreen, in accordance with various aspects of the subject technology.

FIG. 1 illustrates an example of mobile device 102 equipped with touchscreen 108, in accordance with various aspects of the subject technology. Virtual keyboard 104 may be implemented using touchscreen 108 of mobile device 102. Although mobile device 102 is illustrated as a smartphone, it is understood the subject technology is applicable to other devices that may implement virtual keyboards, such as laptop computers, tablet computers (e.g., including e-book readers), video game devices, and the like.

As shown in FIG. 1, the keys of virtual keyboard 104 include alphabet characters and are laid out according to the QWERTY format. However, virtual keyboard 140 is not limited to keys that pertain only to alphabet characters, but can include keys that pertain to other non-alphabet characters, such as numbers, symbols, punctuation, and/or other special characters. According to certain aspects, a user may perform a certain action (e.g., tapping and holding onto a particular key) to display keys that pertain to other non-alphabet characters. In this regard, the keys that are initially provided by virtual keyboard 104 may be referred to as primary keys, while the keys that are provided after the user performs a certain action and subsequently displayed may be referred to as secondary keys.

A user may perform a gesture (e.g., a tap or a swipe) in an attempt to select a particular key. Mobile device 102 may detect the gesture and determine which key to register as the intended actual input from the user. For example, if the user taps a point on touchscreen 108 corresponding to the "S" key, mobile device 102 may detect the tap at that point, and determine that the tap corresponds to the "S" key. Mobile device 102 may therefore register the "S" key as the actual input from the user. Mobile device 102 may then display the letter "S" in text field 106, thereby providing an indication to the user that the "S" key was registered as the actual input. A mistype occurs when the user performs a gesture to select a particular key, but mobile device 102 is not able to determine which key to register as the actual input from the user and/or registers a different key as the actual input from the user. As discussed above, aspects of the subject technology are provided to address this mistyping problem.

Figure 2:
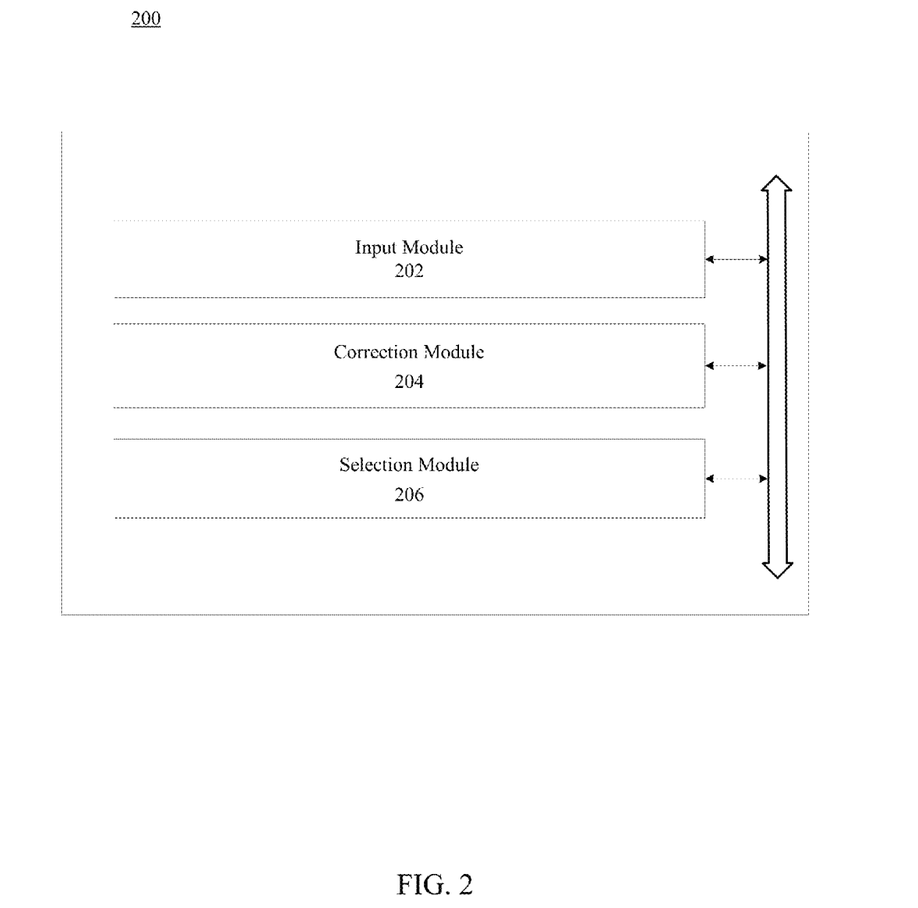
FIG. 2 illustrates an example of a system for registering key inputs, in accordance with various aspects of the subject technology.

FIG. 2 illustrates an example of system 200 for registering key inputs, in accordance with various aspects of the subject technology. System 200, for example, may be part of mobile device 102. System 200 comprises input module 202, correction module 204, and selection module 206. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
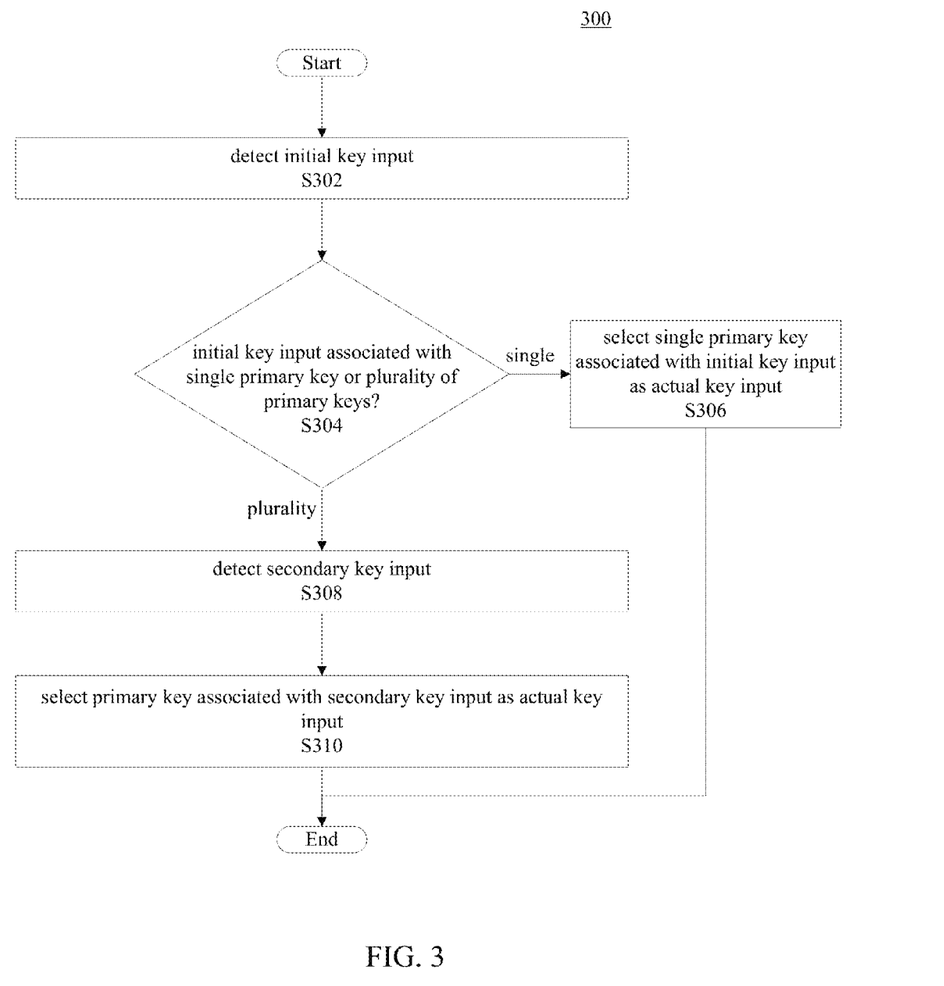
FIG. 3 illustrates an example of a method for registering key inputs, in accordance with various aspects of the subject technology.

FIG. 3 illustrates an example of method 300 for registering key inputs, in accordance with various aspects of the subject technology. System 200, for example, may be used to implement method 300. However, method 300 may also be implemented by systems having other configurations. Although method 300 is described herein with reference to the examples of FIGS. 1, 2, 4, 5A, 5B, 6A, 6B, and 6C, method 300 is not limited to these examples. Furthermore, although method 300 is illustrated in the order shown in FIG. 3, it is understood that method 300 may be implemented in a different order.

According to step S302, input module 202 detects an initial key input by a user at a point on virtual keyboard 104. The initial key input, for example, may be a tap by the user on that point or may be some other suitable gesture performed by the user to indicate a selection of a primary key of virtual keyboard 104. From the initial key input, correction module 204 may attempt to determine the correct primary key that the user intended to select. Depending on where the tap was detected, correction module 204 may or may not be able to determine the correct primary key that the user intended to select. For example, if the tap was substantially on a particular primary key, then correction module 204 may be able to determine that that particular primary key was the primary key that the user intended to select. On the other hand, if the tap was substantially on an area between multiple primary keys and/or if the tap was on a primary key that would produce an error (e.g., a grammatical, spelling, punctuation, and/or linguistic error), then correction module 204 may not necessarily be able to determine which was the primary key that the user intended to select. This is because there may be a plurality of primary keys that could be the primary key that the user intended to select (e.g., any one of the multiple primary keys surrounding the area that was tapped, the primary key that was tapped but would produce an error, and/or the primary key that would replace the primary key producing the error).

Accordingly, correction module 204 may determine whether there is any ambiguity associated with the user's initial key input. In particular, according to step S304, correction module 204 may determine whether the initial key input is associated with a single primary key (e.g., it is not ambiguous which primary key the user is attempting to select) or a plurality of primary keys (e.g., it is ambiguous which primary key the user is attempting to select). According to step S306, if correction module 204 determines that the initial key input is associated with a single primary key, then selection module 206 registers the initial key input as the actual key input from the user (e.g., selects the single primary key as the actual key input).

Figure 4:
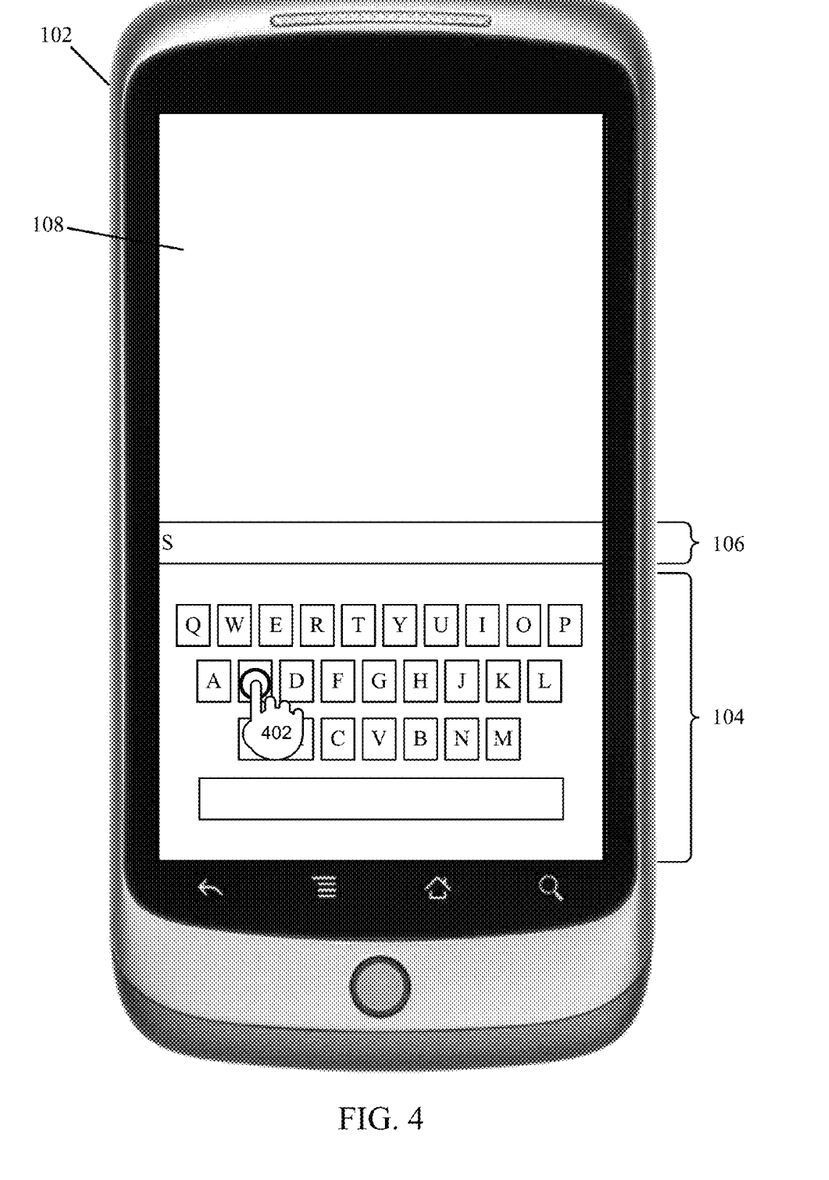
FIG. 4 illustrates an example in which an initial key input is associated with a single primary key and therefore registered as an actual key input, in accordance with various aspects of the subject technology.

FIG. 4 illustrates an example in which the initial key input is associated with a single primary key and therefore registered as the actual key input, in accordance with various aspects of the subject technology. As shown in FIG. 4, the index finger of hand 402 of the user taps touchscreen 108 substantially on the "S" key. Since the tap is substantially on the "S" key and not on any other key, correction module 204 may determine that it is not ambiguous as to which primary key the user intended to select. Thus, correction module 204 may determine that the initial key input (e.g., the tap) intended to select the "S" key and not any other primary key. Selection module 206 may therefore register the "S" key as the actual input from the user. Selection module 206 may then display the letter "S" in text field 106, thereby providing an indication to the user that the "S" key was registered as the actual input.

Returning to step S304 in FIG. 3, if correction module 204 determines that the initial key input is associated with a plurality of primary keys (e.g., it is ambiguous which primary key the user is attempting to select), then aspects of the subject technology provide a mechanism for the user to further specify which was the primary key that the user intended to select. In this regard, according to step S308, input module 202 detects a secondary key input by the user that allows the user to further specify which was the primary key that the user intended to select. The secondary key input may be any suitable gesture that allows the user to make this selection.

In some aspects, the secondary key input may be a swipe gesture by the user from the point at which the initial key input was detected on virtual keyboard 104 towards the particular one of the primary keys that the user intended to select. By allowing the user to perform such a swipe gesture, the user can quickly select the intended primary key if his/her initial key input was ambiguous. For example, if the initial key input is a tap, the secondary key input may be a swipe gesture that continuously follows the tap (e.g., the user may perform the swipe gesture following the tap without having to lift his/her finger up away from touchscreen 108). Thus, the user is allowed to quickly specify which was the primary key that the user intended to select. According to step S310, selection module 206 registers the secondary key input as the actual key input from the user (e.g., selects the particular primary key selected by the user from the swipe gesture as the actual key input).

Figure 5A:
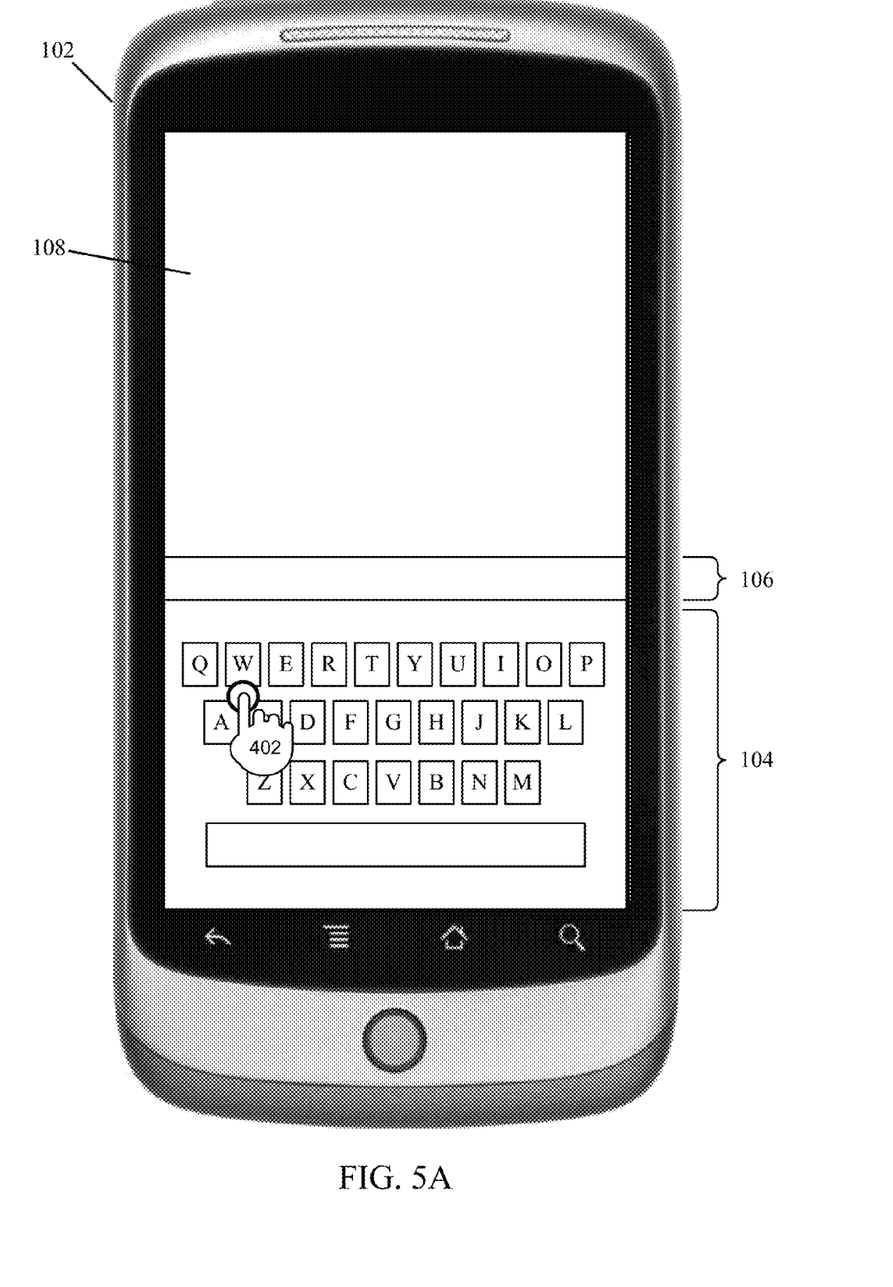
FIGS. 5A and 5B illustrate an example in which an initial key input is associated with a plurality of primary keys and therefore a secondary key input is detected, in accordance with various aspects of the subject technology.
Figure 5B:
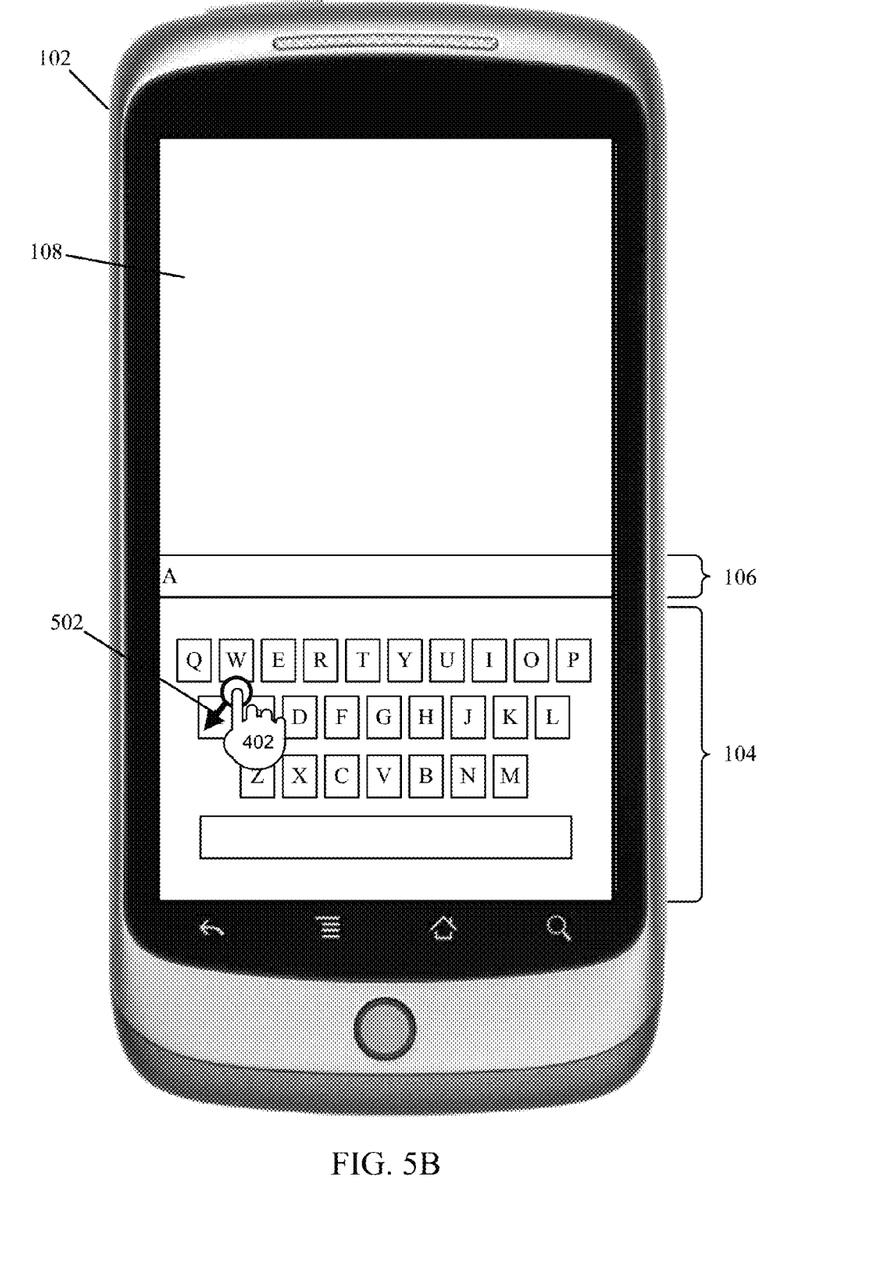

FIGS. 5A and 5B illustrate an example in which the initial key input is associated with a plurality of primary keys and therefore a secondary key input is detected, in accordance with various aspects of the subject technology. As shown in FIG. 5A, the index finger of hand 402 of the user taps touchscreen 108 substantially on an area between the "S," "A," and "W" keys. Since the tap can be a selection of any one of these keys, the user is allowed to perform a secondary key input to further specify which was the primary key that the user intended to select. As shown in FIG. 5B, this secondary input is a swipe gesture by the user from the point at which the user previously tapped to the "A" key, as indicated by arrow 502. Correction module 204 may detect this swipe gesture and determine that the user intended to select the "A" key. Selection module 206 may therefore register the "A" key as the actual input from the user. Selection module 206 may then display the letter "A" in text field 106, thereby providing an indication to the user that the "A" key was registered as the actual input.

Although virtual keyboard 104 is described herein as being a user interface that is displayed to the user, the subject technology is equally applicable to keyboards that are not displayed to users (e.g., keyboards that do not have any keys visible to the user). For example, a touchpad/trackpad may be used as a platform for a virtual keyboard. The touchpad/trackpad may be blank and may not necessarily provide any indication of where keys would be. Nevertheless, a user familiar with the QWERTY format may still be able to type on the touchpad/trackpad as if the keyboard were still there. In this regard, the initial key input and/or secondary key input from the user may still be detected in accordance with various aspects of the subject technology.

In some aspects, a menu or any other suitable mechanism may be used to show the user which keys the user may select using the secondary key input. For example, after step S304 in FIG. 3, a menu may be displayed to show the user which keys the user may select using the secondary key input. As discussed above, the keys that are initially provided by virtual keyboard 104 may be referred to as primary keys, while the keys that are provided after the user performs a certain action and subsequently displayed may be referred to as secondary keys. In this regard, the keys displayed by the menu may be referred to as secondary keys.

Figure 6A:
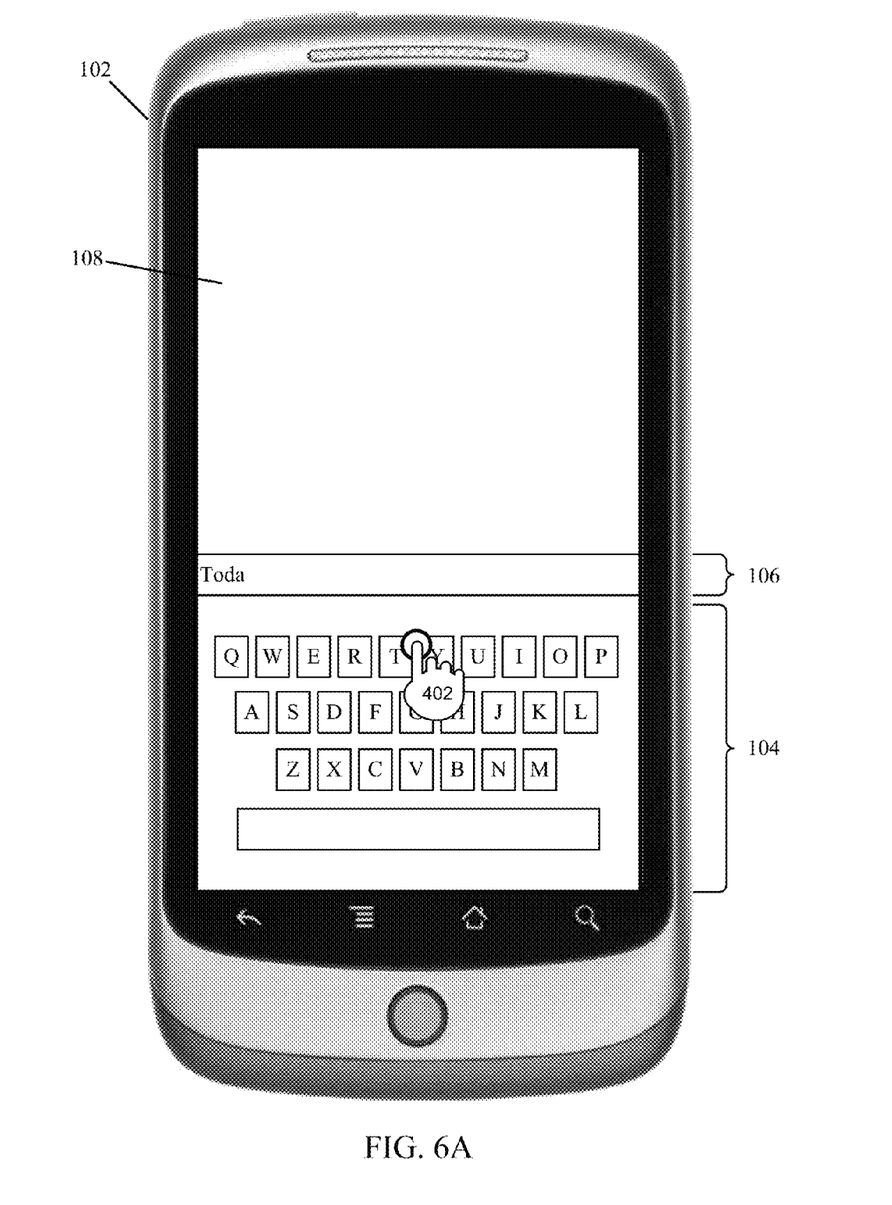
FIGS. 6A, 6B, and 6C illustrate an example in which a menu is displayed to show a user which keys the user may select using a secondary key input, in accordance with various aspects of the subject technology.
Figure 6B:
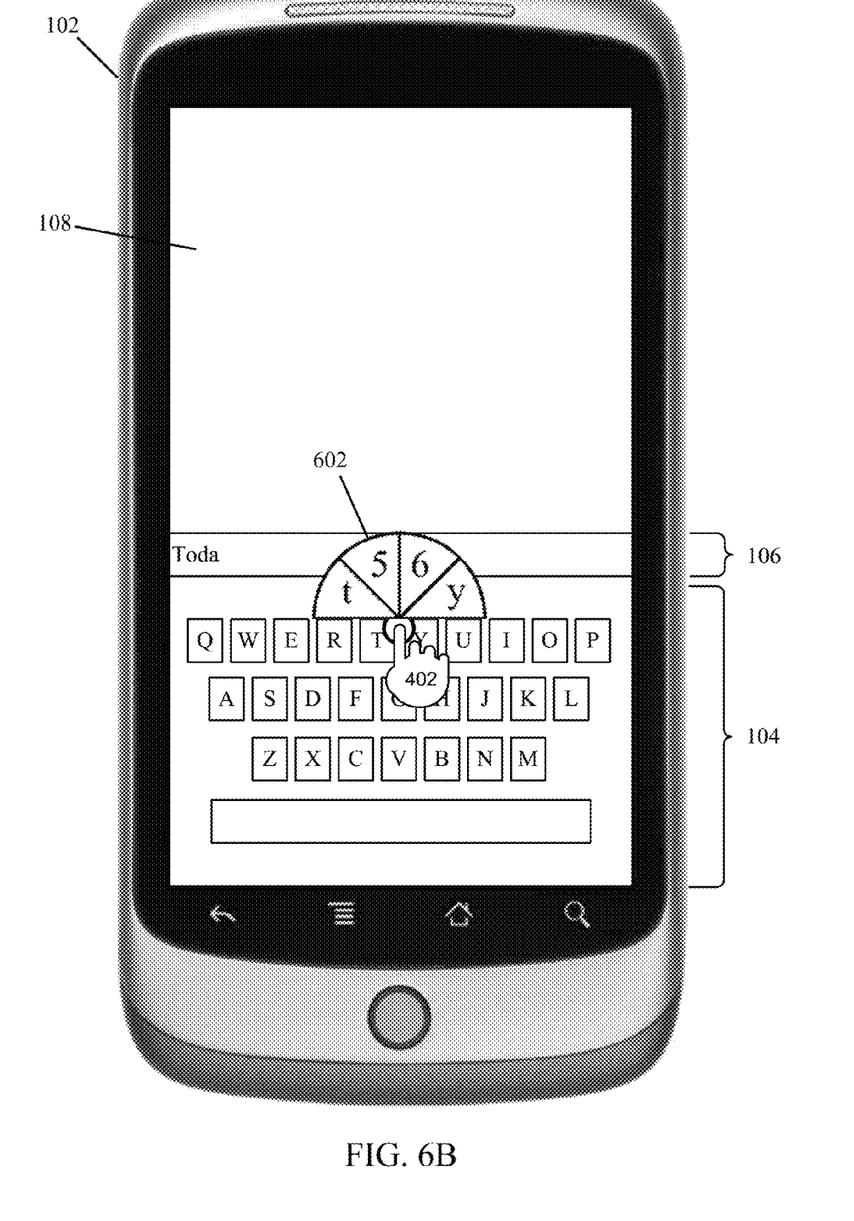

FIGS. 6A, 6B, and 6C illustrate an example in which menu 602 is displayed to show the user which keys the user may select using the secondary key input, in accordance with various aspects of the subject technology. As shown in FIG. 6A, the phrase, "Toda" is shown in text field 106, and the index finger of hand 402 of the user taps touchscreen 108 substantially on an area between the "T" and "Y," presumably to complete the phrase "Toda" with either "T" or "Y". Since the tap can be a selection of any one of these keys, the user is allowed to perform a secondary key input to further specify which was the primary key that the user intended to select. As shown in FIG. 6B, menu 602 is displayed to show secondary keys that the user may select using the secondary key input. The secondary keys shown in menu 602 include the "T" and the "Y" keys, but are displayed in menu 602 in lower case versions (e.g., since this key is not the beginning of a sentence and therefore does not need to be capitalized). Furthermore, the "T" and "Y" keys are displayed in menu 602 in a larger area to make it easier for the user to select either of these keys using the secondary key input.

As discussed above, a user may perform a certain action on virtual keyboard 104 to display keys that pertain to other non-alphabet characters. For example, the user may tap and hold onto the "T" key to display the "5" key as a key that can be selected. Similarly, the user may tap and hold onto the "Y" key to display the "6" key as a key that can be selected. According to certain aspects, non-alphabet characters and/or other additional characters may also be displayed in menu 602 to allow the user to select these keys. As shown in FIG. 6B, menu 602 includes the "5" and "6" keys.

Figure 6C:
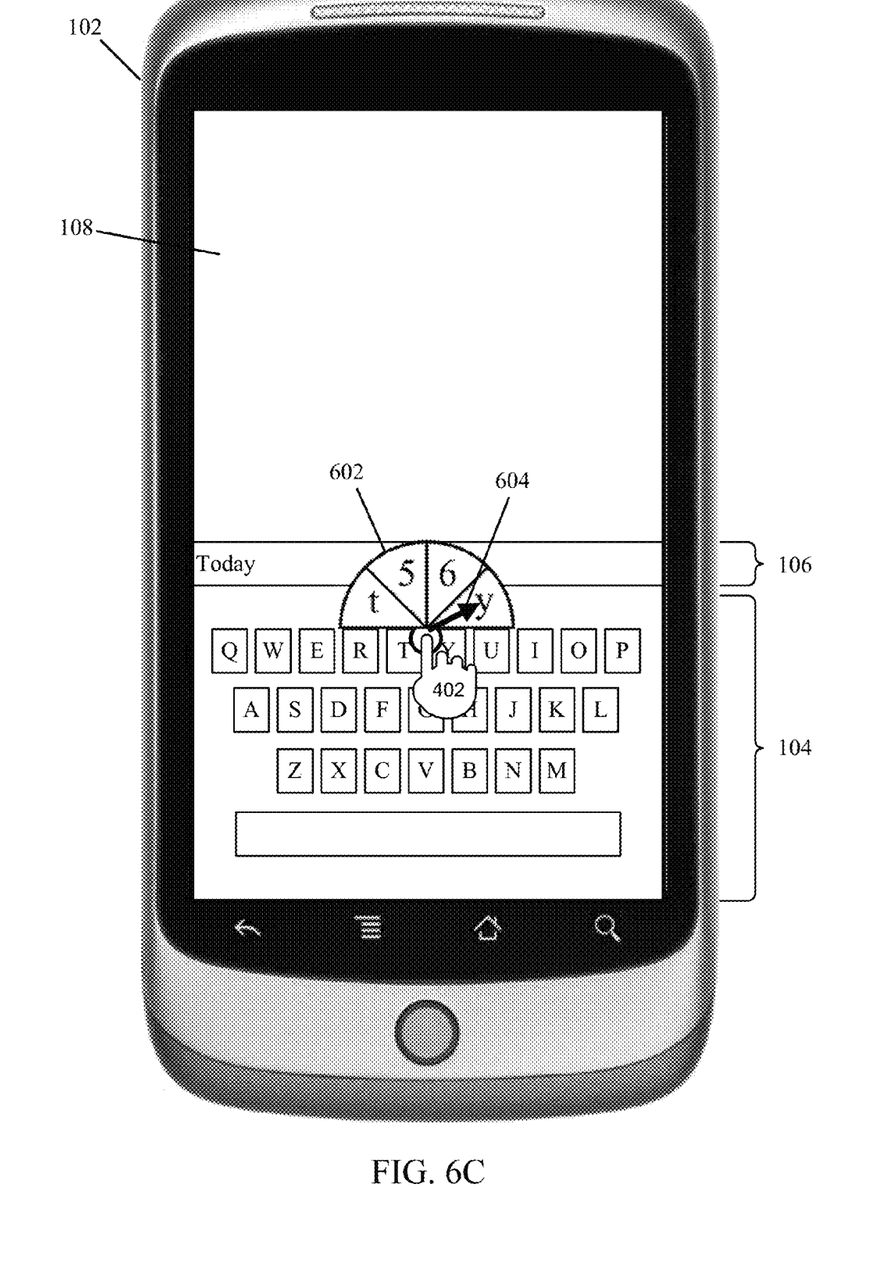

As shown in FIG. 6C, the secondary input by the user is a swipe gesture from the point at which the user previously tapped to the "Y" key displayed in menu 602, as indicated by arrow 604. Correction module 204 may detect this swipe gesture and determine that the user intended to select the "Y" key (e.g., its lower case version). Selection module 206 may therefore register the "Y" key as the actual input from the user. Selection module 206 may then display the letter "Y" in text field 106 (e.g., completing the word "Today"), thereby providing an indication to the user that the "Y" key was registered as the actual input.

Figure 7:
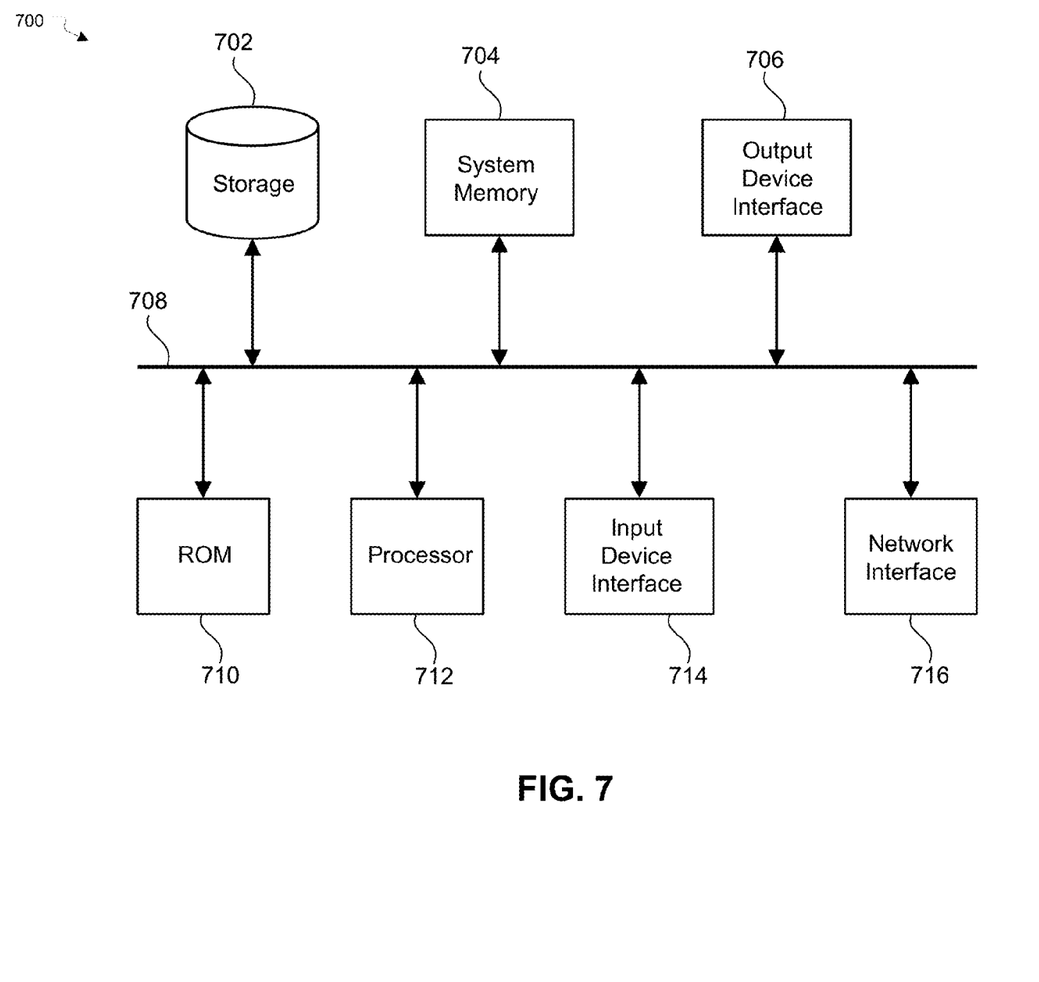
FIG. 7 conceptually illustrates an electronic system with which aspects of the subject technology may be implemented.

FIG. 7 conceptually illustrates electronic system 700 with which aspects of the subject technology may be implemented. Electronic system 700, for example, can be a desktop computer, a laptop computer, a tablet computer, a server, a phone, a personal digital assistant (PDA), a video game device, any device that registers key inputs, or generally any electronic device that transmits signals over a network. Such an electronic system includes various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for registering key inputs, the system comprising:
    one or more processors; and
    memory storing one or more programs to be executed by the one or more processors, the one or more programs comprising:
    an input module configured to detect a first key input by a user at a point on a layout of primary keys;
    a correction module configured to determine whether the first key input is associated with a single one of the primary keys or a plurality of the primary keys,
    wherein the input module is configured to detect a second key input if the first key input is determined to be associated with the plurality of the primary keys,
    wherein the second key input comprises a swipe gesture by the user from the point at which the first key input is detected on the layout towards a particular one of the plurality of the primary keys, and
    wherein the first key input comprises a tap by the user on the point on the layout of the primary keys, and wherein the tap is continuously followed by the swipe gesture to select, without releasing contact, the particular one of the plurality of the primary keys; and
    a selection module configured to register the first key input or the second key input as an actual key input.

2. The system of claim 1, wherein the first key input determined to be associated with the single one of the primary keys comprises a tap by the user substantially on the single one of the primary keys.

3. The system of claim 1, wherein the first key input determined to be associated with the plurality of the primary keys comprises a tap by the user substantially on an area between a first one of the plurality of the primary keys and a second one of the plurality of the primary keys.

4. The system of claim 3, wherein the particular one of the plurality of the primary keys comprises the first one or the second one of the plurality of the primary keys.

5. The system of claim 1, wherein the first key input determined to be associated with the plurality of the primary keys comprises a tap by the user on a first one of the plurality of the primary keys determined to be replaceable by a second one of the plurality of the primary keys.

6. The system of claim 5, wherein the first one of the plurality of the primary keys is determined to be replaceable by the second one of the plurality of the primary keys based on at least one of grammar, punctuation, spelling, or linguistics.

7. The system of claim 1, wherein the swipe gesture is from the point at which the first key input is detected on the layout to the particular one of the plurality of the primary keys.

8. The system of claim 1, wherein the point at which the first key input is detected is adjacent to the particular one of the plurality of the primary keys.

9. The system of claim 1, wherein the correction module is configured to display a layout of one or more secondary keys in response to the first key input being determined to be associated with the plurality of the primary keys, and wherein the one or more secondary keys comprises at least one of the plurality of the primary keys.

10. The system of claim 9, wherein at least one of the one or more secondary keys is different from the primary keys.

11. The system of claim 1, wherein the selection module is configured to select the particular one of the plurality of the primary keys as the actual key input if the first key input is determined to be associated with the plurality of the primary keys.

12. The system of claim 11, wherein the selection module is configured to not select another one of the plurality of the primary keys as the actual key input if the first key input is determined to be associated with the plurality of the primary keys.

13. The system of claim 1, wherein the selection module is configured to select the single one of the primary keys as the actual key input if the first key input is determined to be associated with the single one of the primary keys.

14. A method for registering key inputs, the method comprising:
   detecting a first key input by a user at a point on a layout of primary keys;
   determining whether the first key input is associated with a single one of the primary keys or a plurality of the primary keys;
   detecting a second key input if the first key input is determined to be associated with the plurality of the primary keys,
   wherein the second key input comprises a swipe gesture by the user from the point at which the first key input is detected on the layout towards a particular one of the plurality of the primary keys,
   wherein the first key input comprises a tap by the user on the point on the layout of the primary keys, and wherein the tap is continuously followed by the swipe gesture to select, without releasing contact, the particular one of the plurality of the primary keys; and
   registering, by a processor, the first key input or the second key input as an actual key input.

15. The method of claim 14, wherein the layout of the primary keys comprises a virtual keyboard.

16. The method of claim 15, wherein the virtual keyboard is not displayed to the user.

17. A non-transitory computer program product comprising instructions stored in a tangible computer-readable storage medium, the instructions comprising:
   instructions for detecting a first key input by a user at a point on a layout of primary keys, wherein the first key input comprises a tap by the user on the point on the layout of the primary keys, and wherein the layout of primary keys comprises a virtual keyboard;
   instructions for determining whether the first key input is associated with a single one of the primary keys or a plurality of the primary keys;
   instructions for detecting a second key input if the first key input is determined to be associated with the plurality of the primary keys,
   wherein the second key input comprises a swipe gesture by the user from the point at which the first key input is detected on the layout to a particular one of the plurality of the primary keys,
   wherein the first key input comprises a tap by the user on the point on the layout of the primary keys, and wherein the tap is continuously followed by the swipe gesture to select, without releasing contact, the particular one of the plurality of the primary keys; and
   instructions for registering, by a processor, the first key input or the second key input as an actual key input.

18. The computer program product of claim 17, wherein the instructions further comprise instructions for displaying a layout of one or more secondary keys in response to the first key input being determined to be associated with the plurality of the primary keys, and wherein the one or more secondary keys comprises at least one of the plurality of the primary keys.

19. The computer program product of claim 18, wherein at least one of the one or more secondary keys is different from the primary keys.

* * * * *